(12) United States Patent
Xie

(10) Patent No.: US 12,449,992 B2
(45) Date of Patent: Oct. 21, 2025

(54) MEMORY DEVICES AND OPERATION METHODS THEREOF, AND MEMORY SYSTEMS AND STORAGE MEDIUMS

(71) Applicant: Yangtze Memory Technologies Co., Ltd., Hubei (CN)

(72) Inventor: Shu Xie, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/736,132

(22) Filed: Jun. 6, 2024

(65) Prior Publication Data
US 2025/0231701 A1    Jul. 17, 2025

(30) Foreign Application Priority Data
Jan. 15, 2024   (CN) .......................... 202410058348.X

(51) Int. Cl.
G06F 3/06    (2006.01)

(52) U.S. Cl.
CPC .......... G06F 3/0632 (2013.01); G06F 3/0604 (2013.01); G06F 3/0679 (2013.01)

(58) Field of Classification Search
CPC ..... G06F 3/0632; G06F 3/0604; G06F 3/0679
See application file for complete search history.

(56) References Cited

U.S. PATENT DOCUMENTS

| 2008/0266956 | A1* | 10/2008 | Byeon ................. G11C 29/806 |
| | | | 365/185.11 |
| 2010/0269000 | A1* | 10/2010 | Lee ........................ G11C 29/52 |
| | | | 711/E12.001 |
| 2018/0081797 | A1* | 3/2018 | Yang ................... G06F 12/0292 |
| 2020/0066348 | A1* | 2/2020 | Lee ....................... G11C 16/0483 |
| 2022/0392562 | A1* | 12/2022 | Hung ................... G11C 29/886 |
| 2024/0220110 | A1* | 7/2024 | Lee ....................... G06F 3/0653 |

* cited by examiner

Primary Examiner — Edward J Dudek, Jr.
(74) Attorney, Agent, or Firm — HANLEY, FLIGHT & ZIMMERMAN, LLC

(57) ABSTRACT

Examples of the present disclosure provide a memory device and an operation method thereof, a memory system and a storage medium. The memory device includes: a memory cell array, and a peripheral circuit coupled with the memory cell array, wherein the peripheral circuit is configured to: before performing a power on reset operation, set all state information of a plurality of main memory areas in a page buffer to a normal state; in the process of performing the power on reset operation, match a second address of each of the plurality of main memory areas with a first address in a register; and determine, according to a match result, whether to modify state information of a respective main memory area in the page buffer to a fault state.

20 Claims, 12 Drawing Sheets

| | State information | | Match |
| --- | --- | --- | --- |
| | Main memory area | Redundant memory area | |
| Before performing the power on reset operation | Normal state | Fault state | 0 |
| In the process of performing the power on reset operation | Normal state | Fault state | 0 |
| In the process of performing the power on reset operation | Fault state (applying a toggle current) | Normal state (toggle) | 1 |
| After performing the power on reset operation | Normal state (except for main memory areas being replaced) | Redundant memory areas being replaced are in the normal state, and the redundant memory areas being not replaced are in the fault state | 0 |

| | State information | | Match |
|---|---|---|---|
| | Main memory area | Redundant memory area | |
| Before performing the power on reset operation | Normal state | Fault state | 0 |
| In the process of performing the power on reset operation | Normal state | Fault state | 0 |
| In the process of performing the power on reset operation | Fault state (applying a toggle current) | Normal state (toggle) | 1 |
| After performing the power on reset operation | Normal state (except for main memory areas being replaced) | Redundant memory areas being replaced are in the normal state, and the redundant memory areas being not replaced are in the fault state | 0 |

FIG. 7

|  | Main memory area | | Redundant memory area | Match signal |
|---|---|---|---|---|
|  | Ysel : <7:1> | Ysel : <0> | | |
| Example I | 0 | 1 | 1 | One time for 1, and seven times for 0 |
| Example II | 1 | 0 | 0 | Seven times for 1, and one time for 0 |

FIG. 8

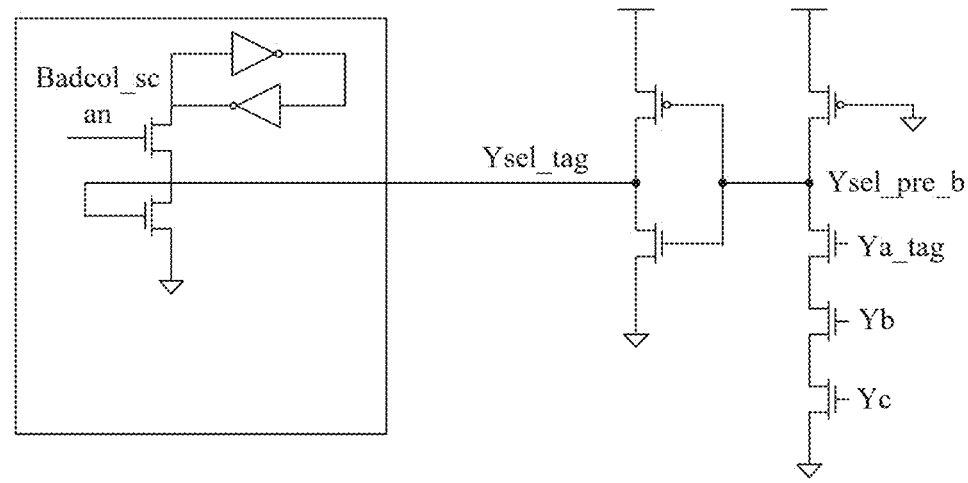
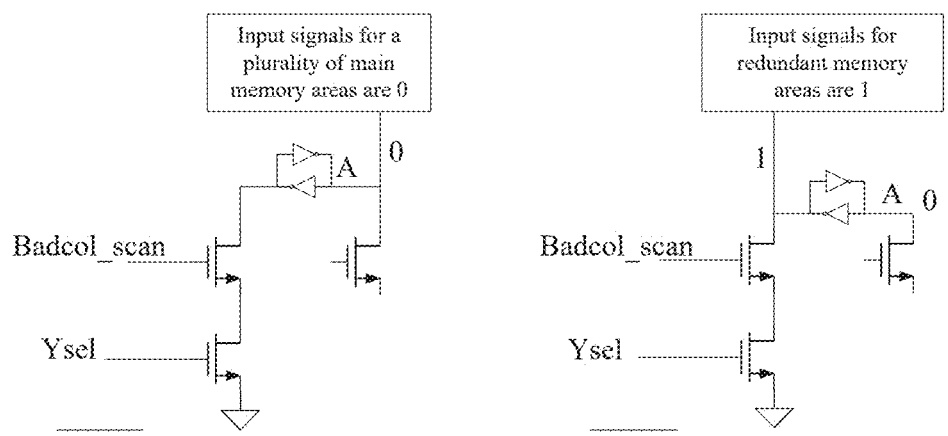
FIG. 9

MEMORY DEVICES AND OPERATION METHODS THEREOF, AND MEMORY SYSTEMS AND STORAGE MEDIUMS

CROSS-REFERENCE TO RELATED APPLICATIONS

The present application claims the benefit of priority to China Application No. 202410058348.X, filed on Jan. 15, 2024, the content of which is incorporated herein by reference in its entirety.

TECHNICAL FIELD

Examples of the present disclosure relate to the field of semiconductor technology, and in particular, to memory devices and operation methods thereof, memory systems and storage mediums.

BACKGROUND

A memory device is a storage device configured to save information in the modern information technology. As a typical non-volatile semiconductor memory, the Not-And (NAND) type memory gradually became a mainstream product in the storage market as it has a relatively-high storage density, controllable production cost, appropriate encoding and erasing speed, and retention characteristic.

BRIEF DESCRIPTION OF THE DRAWINGS

FIG. 7 is a state information table of a main memory area and a redundant memory area according to an example of the present disclosure;

FIG. 8 shows the number of times to apply a toggle current to a column selector in Example I and Example II according to an example of the present disclosure;

FIG. 9 is a schematic diagram of a circuit structure of a page buffer and a column selector before performing a power on reset operation according to an example of the present disclosure;

Figure 1:
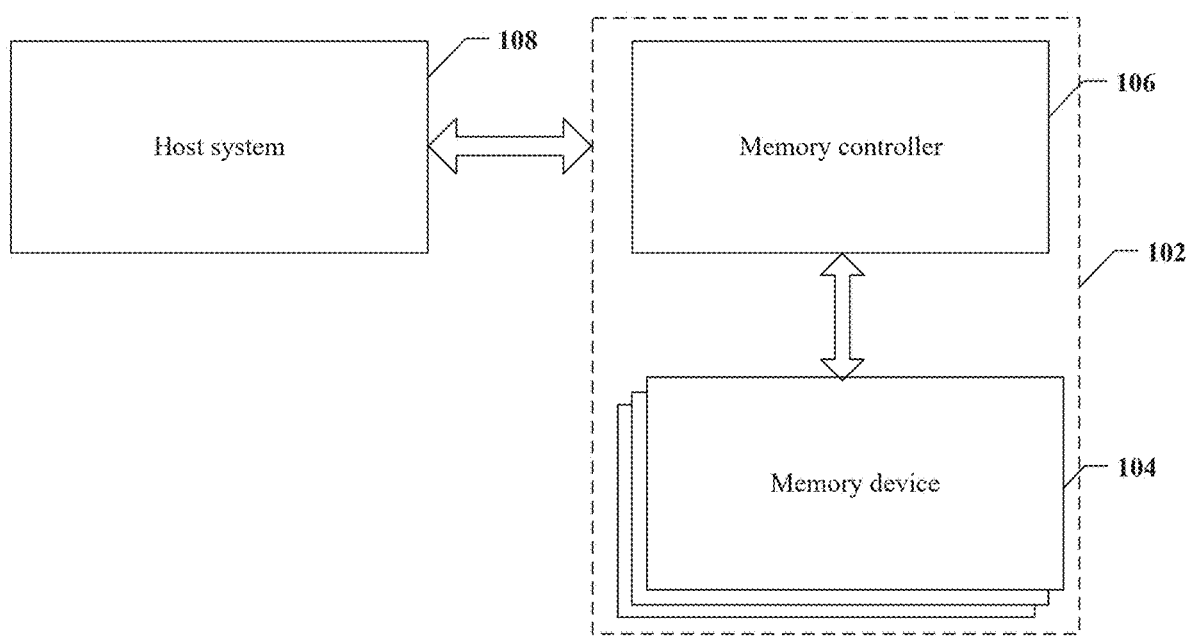
FIG. 1 is a schematic diagram of an example system with a memory system according to an example of the present disclosure.

In the above drawings (which are not drawn to scale), like reference numerals may describe like parts in the different views. Like reference numbers with different letter suffixes may indicate different examples of like parts. The drawings illustrate the various examples discussed herein, by way of example and not limitation.

DETAILED DESCRIPTION

Examples of the present disclosure will be described in more detail below with reference to the accompanying drawings. Although examples of the present disclosure are shown in the drawings, it should be understood that the present disclosure may be implemented in various ways and should not be limited to the DETAILED DESCRIPTION set forth herein. Rather, these examples are provided so that the present disclosure can be more thoroughly understood and the scope of the present disclosure can be fully conveyed to those skilled in the art.

In the following description, numerous specific details are given in order to provide a more thorough understanding of the present disclosure. It will be apparent, however, to one skilled in the art that the present disclosure may be practiced without one or more of these details. In other examples, some technical features well-known in the art are not described to avoid confusion with the present disclosure; that is, not all features of the actual example are described here, and well-known functions and structures are not described in detail.

In the drawings, the size of layers, regions, elements and their relative sizes may be exaggerated for clarity. Like reference numerals refer to like elements throughout.

It will be understood that when an element or layer is referred to as being "on," "adjacent to," "connected to" or "coupled to" other elements or layers, it can be directly on, adjacent to, connected to, or coupled to other elements or layers, or intervening elements or layers may be present. In contrast, when an element is referred to as being "directly on," "directly adjacent to," "directly connected to" or "directly coupled to" other elements or layers, there are no intervening elements or layers. It will be understood that, although the terms such as first, second, third etc. may be used to describe at least one of various elements, components, regions, layers or sections, at least one of these elements, components, regions, layers or sections should not be limited by these terms. These terms are only used to distinguish one element, component, region, layer or section from another element, component, region, layer or section. Thus, a first element, component, region, layer or section discussed below could be represented as a second element, component, region, layer or section without departing from the teachings of the present disclosure. When a second element, component, region, layer or section is discussed, it does not indicate that a first element, component, region, layer or section exists in the present disclosure.

Spatial relationship terms such as "under", "below", "beneath", "underneath", "on", "above" and so on, can be used here for convenience to describe the relationship between one element or feature and other elements or features shown in the figures. It will be understood that the spatially relationship terms also comprise different orientations of the device in use and operation in addition to the orientation depicted in the figures. For example, if the device in the figures is turned over, elements or features described as "below" or "underneath" or "under" other elements or features would then be oriented as "above" the other elements or features. Thus, the example terms "below" and "under" can comprise both orientations of above and below. The device may be otherwise oriented (rotated 90 degrees or at other orientations) and the spatial descriptors used herein may be interpreted accordingly.

The terminology used herein is for the purpose of describing particular examples only and is not to be taken as a limitation of the present disclosure. As used herein, "a", "an" and "said/the" in singular forms are intended to include the plural forms as well, unless the context clearly dictates otherwise. It should also be understood that at least one of the terms "consists of" or "comprising", when used in this specification, identify the presence of at least one of stated features, integers, operations, elements or components, but do not exclude presence or addition of at least one of one or more other features, integers, operations, elements, components or groups. As used herein, the term "at least one of . . . " includes any and all combinations of the associated listed items.

For ease of understanding the characteristics and technical content of the examples of the present disclosure in more detail, the examples of the present disclosure will be described in detail below in conjunction with the accompanying drawings. The attached drawings are only for reference and description, and are not intended to limit the examples of the present disclosure.

The memory device in the examples of the present disclosure includes but is not limited to a three-dimensional NAND type memory, and for ease of understanding, a three-dimensional NAND type memory is used as an example for illustration.

FIG. 1 illustrates a block diagram of an example system 100 having a memory device, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host system 108 and a memory system 102 having one or more memory devices 104 and a memory controller 106. Host system 108 can be a processor of an electronic device, such as a central processing unit (CPU), or a system-on-chip (SoC), such as an application processor (AP). Host system 108 can be configured to send or receive data to or from the memory device 104.

Memory controller 106 is coupled to the memory device 104 and host system 108 and is configured to control the memory device 104, according to some examples. Memory controller 106 can manage the data stored in memory device 104 and communicate with host system 108. In some examples, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some examples, memory controller 106 is designed for operating in a high duty-cycle environment solid state disks (SSD) or embedded multi-media-cards (eMMCs) used as data storage for mobile devices, such as smartphones, tablets, laptop computers, etc., and enterprise storage arrays.

Memory controller 106 can be configured to control operations of the memory device 104, such as read, erase, and program operations. Memory controller 106 can also be configured to manage various functions with respect to the data stored or to be stored in the memory device 104 including, but not limited to bad-block management, garbage collection, logical-to-physical address conversion, wear leveling, etc. In some examples, memory controller 106 is further configured to process error correction codes (ECC) with respect to the data read from or written to the memory device 104. Any other suitable functions may be performed by memory controller 106 as well, for example, formatting the memory device 104. Memory controller 106 can communicate with an external device (e.g., host system 108) according to a particular communication protocol. For example, memory controller 106 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 2A:
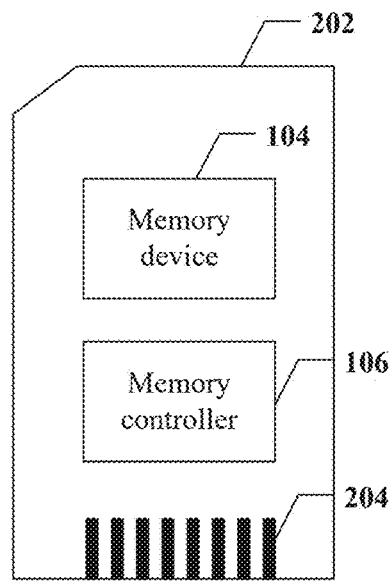
FIG. 2A is a schematic diagram of an example memory card with a memory system according to an example of the present disclosure.
Figure 2B:
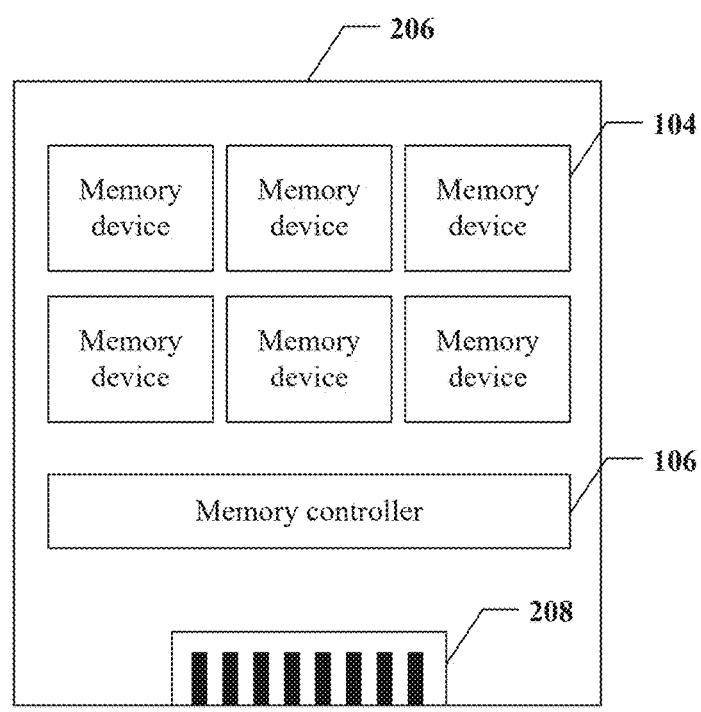
FIG. 2B is a schematic diagram of an example solid state drive with a memory system according to an example of the present disclosure.

Memory controller 106 and one or more memory devices 104 can be integrated into various types of storage devices, for example, be included in the same package, such as a universal Flash storage (UFS) package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling the memory card 202 with a host (e.g., host system 108 in FIG. 1). In another example as shown in FIG. 2B, the memory controller 106 and multiple memory devices 104 may be integrated into an SSD 206. SSD 206 can further include an SSD connector 208 coupling SSD 206 with a host (e.g., host system 108 in FIG. 1). In some examples, at least one of the storage capacity or the operation speed of SSD 206 is greater than those of memory card 202.

Figure 3A:
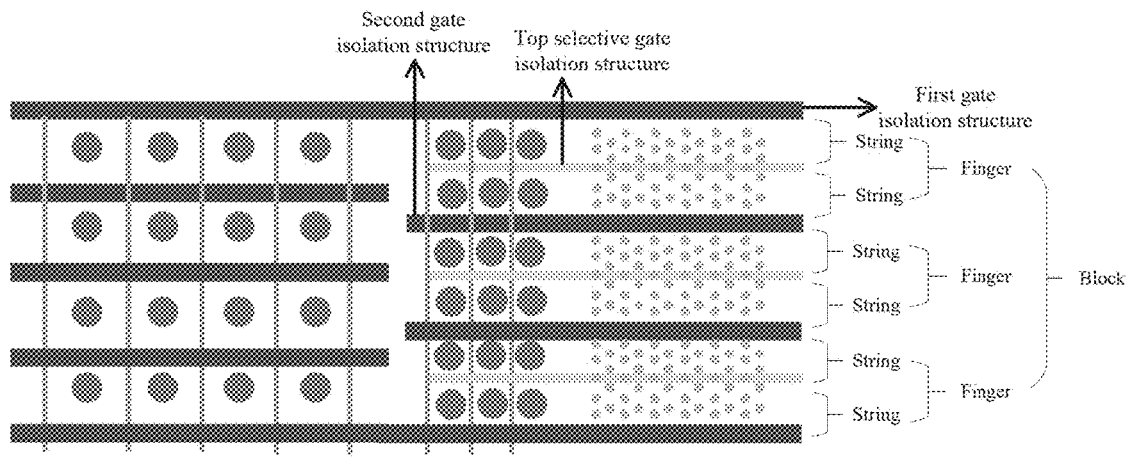
FIG. 3A is a schematic diagram of the distribution of memory cells of a three-dimensional NAND type memory according to an example of the present disclosure.

FIG. 3A provides a structural schematic diagram of a memory cell array of a three-dimensional NAND type memory. As shown in FIG. 3A, the memory cell array of a three-dimensional NAND type memory consists of several memory cell rows parallel to a gate isolation structure and staggered in parallel. Every two rows of the memory cell rows are separated by a gate isolation structure and a top selective gate isolation structure, and each memory cell row includes a plurality of memory cells. The gate isolation structure may include a first gate isolation structure and a second gate isolation structure. The first gate isolation structure divides the memory cell array into a plurality of blocks, the plurality of second gate isolation structures can divide the blocks into multiple fingers, and the top selective gate isolation structure provided in the middle of each finger can divide the finger into two parts, so that the finger is divided into two strings. A block shown in FIG. 3A contains 6 strings, and in practical applications, the number of strings in a block is not limited to this.

It should be noted that the number of memory cell rows between the gate isolation structure and the top selective gate isolation structure shown in FIG. 3A is merely an example, and is not used for limiting the number of memory cell rows contained in one finger of the three-dimensional NAND type memory in the present disclosure. In practical applications, the number of memory cell rows contained in one finger can be adjusted according to actual conditions, such as 2, 4, 8, 16, and so on.

Figure 3B:
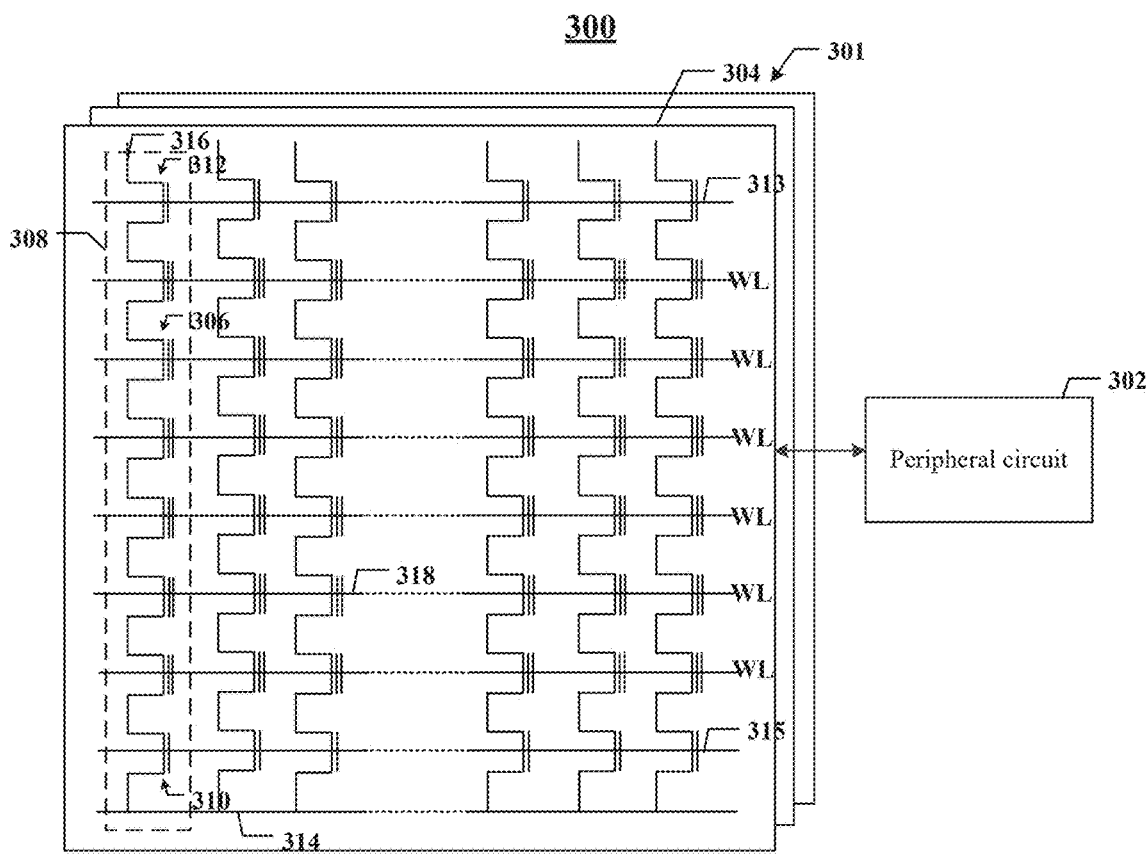
FIG. 3B is a schematic diagram of an example memory including a peripheral circuit according to an example of the present disclosure.

FIG. 3B illustrates a schematic circuit diagram of an example memory device 300 including a peripheral circuit, according to some aspects of the present disclosure. The memory device 300 can be an example of the memory device 104 in FIG. 1. The memory device 300 can include a memory cell array 301 and a peripheral circuit 302 coupled to the memory cell array 301. The memory cell array 301 is illustrated as an example of a three-dimensional NAND type memory cell array, in which memory cells 306 are NAND type memory cells and are provided in the form of an array of strings 308 each extending vertically above a substrate (not shown). In some examples, each string 308 includes a plurality of memory cells 306 coupled in series and stacked vertically. Each memory cell 306 can hold a continuous, analog value, such as an electrical voltage or charge, that depends on the number of electrons trapped within a region of the memory cell 306. Each memory cell 306 can be either a floating gate type of memory cell including a floating-gate transistor or a charge trap type of memory cell including a charge-trap transistor.

In some examples, each memory cell 306 is a single-level cell (SLC) that has two possible memory states and thus, can store one bit of data. For example, the first memory state "0" can correspond to a first range of voltages, and the second memory state "1" can correspond to a second range of voltages. In some examples, each memory cell 306 is a multi-level cell (MLC) that is capable of storing more than a single bit of data in more than four memory states. For example, the MLC can store two bits per cell (also known as Double-Level Cell), three bits per cell (also known as Trinary-Level cell (TLC)), four bits per cell (also known as a Quad-Level cell (QLC)), five bits per cell (also known as a Penta-Level cell (PLC)) or more than five bits per cell. Each MLC can be programmed to assume a range of possible nominal storage values. In one example, if each MLC stores two bits of data, then the MLC can be programmed to assume one of three possible programming levels from an erased state by writing one of three possible nominal storage values to the cell. A fourth nominal storage value can be used for the erased state.

As shown in FIG. 3B, each string 308 can include a bottom selective transistor (also referred to as a source side selective transistor, which includes a source selective gate BSG 310) at its source end and a top selective transistor (also known as a drain side selective transistor, which includes a drain selective gate TSG 312) at its drain end. Source selective gate BSG 310 and drain selective gate TSG 312 can be configured to activate selected strings 308 during read and program operations. In some examples, the sources of strings 308 in the same block 304 are coupled through the same source line (SL) 314, e.g., a common SL. In other words, all strings 308 in the same block 304 have an array common source (ACS), according to some examples. TSG 312 of each string 308 is coupled to a respective bit line (BL) 316 from which data can be read or written via an output bus (not shown), according to some examples. In some examples, each string 308 is configured to be selected or deselected by at least one of: applying a select voltage (e.g., above the threshold voltage of the transistor having TSG 312) or a deselect voltage (e.g., 0 V) to respective TSG 312 through one or more TSG lines 313 or applying a select voltage (e.g., above the threshold voltage of the transistor having BSG 310) or a deselect voltage (e.g., 0 V) to respective BSG 310 through one or more BSG lines 315.

As shown in FIG. 3B, the strings 308 can be organized into multiple blocks 304, each of which can have a common source line 314, e.g., coupled to the ground. In some examples, each block 304 is the basic data unit for erase operations, i.e., all memory cells 306 on the same block 304 are erased at the same time. To erase memory cells 306 in a selected block 304, source lines 314 coupled to the selected block 304 as well as unselected blocks 304 in the same plane as the selected block 304 can be biased with an erase voltage (Vers), such as a high positive voltage (e.g., 20 V or more). It is understood that in some examples, erase operation may be performed at a half-block level, a quarter-block level, or a level having any suitable number of blocks or any suitable fractions of a block. Memory cells 306 of adjacent strings 308 can be coupled through word lines 318 that select which row of memory cells 306 is affected by read and program operations. In some examples, with reference to FIG. 3A above, the plurality of memory cells are isolated by the top selective gate isolation structure and the gate isolation structure. The multiple memory cells between the top selective gate isolation structure and the gate isolation structure are arranged into multiple memory cell rows, and each memory cell row is parallel to the gate isolation structure and the top selective gate isolation structure.

Referring to FIG. 3A and FIG. 3B, each memory cell 306 of the plurality of memory cells is coupled to respective word lines 318, and each string 308 is coupled to respective bit lines 316 via a respective selective transistor (such as top selective transistor).

Figure 4:
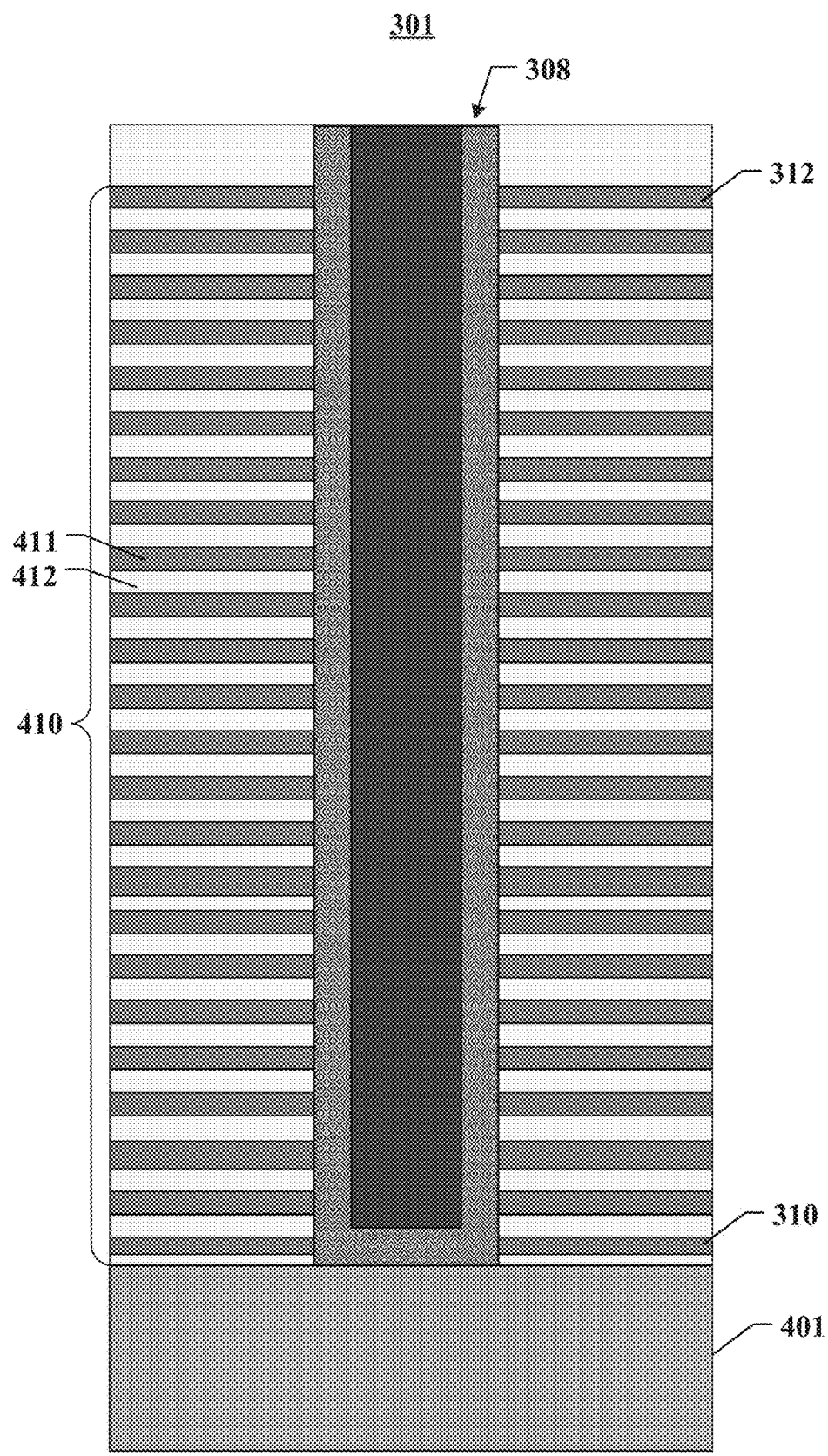
FIG. 4 is a schematic cross-sectional view of a memory cell array including NAND type strings according to an example of the present disclosure.

FIG. 4 shows a schematic cross-sectional view of an example memory cell array 301 including strings 308, shown as an example NAND, in accordance with aspects of the present disclosure. As shown in FIG. 4, the NAND memory cell array 301 may include a stacked structure 410, which includes a plurality of gate layers 411 and a plurality of insulating layers 412 alternately stacked in sequence, and a channel structure penetrating vertically through the gate layers 411 and the insulating layers 412. The channel structure is coupled with each gate layer to form a memory cell, and the channel structure is coupled with multiple gate layers in the stacked structure 410 to form a string 308. The gate layer 411 and the insulating layer 412 can be stacked alternately, and two adjacent gate layers 411 are separated by an insulating layer 412.

The constituent material of the gate layer 411 may include a conductive material. The conductive material may include but is not limited to tungsten (W), cobalt (Co), Copper (Cu), aluminum (Al), polysilicon, doped silicon, silicide, or any combination thereof. In some examples, each gate layer 411 may include a metal layer, e.g., a tungsten layer. In some examples, each gate layer 411 includes a doped polysilicon layer. Each gate layer 411 may include a control gate surrounding the memory cell. The gate layer 411 at the top of the stacked structure 410 may extend laterally as a top selective gate line, the gate layer 411 at the bottom of the stacked structure 410 may extend laterally as a bottom selective gate line, and the gate layer 411 extending laterally between the top selective gate line and the bottom selective gate line may be used as a word line layer.

In some examples, the stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other suitable material.

In some examples, the string 308 includes a channel structure extending vertically through the stacked structure 410. In some examples, the channel structure includes a channel hole filled with semiconductor material(s) (e.g., as a semiconductor channel) and dielectric material(s) (e.g., as a memory film). In some examples, the semiconductor channel includes silicon, e.g., polysilicon. In some examples, the memory film is a composite dielectric layer including a tunneling layer, a storage layer (also referred to as a "charge trap/storage layer"), and a blocking layer. The channel structure may have a cylindrical shape (e.g., a pillar shape). According to some examples, the semiconductor channel, the tunneling layer, the storage layer and the blocking layer are radially arranged in this order from the center of the pillar toward the outer surface of the pillar. The tunneling layer may include silicon oxide, silicon oxynitride, or any combination thereof. The storage layer may include silicon nitride, silicon oxynitride, or any combination thereof. The blocking layer may include silicon oxide, silicon oxynitride, a high dielectric constant (high-k) dielectric, or any combination thereof. In one example, the memory film may include a composite layer of silicon oxide/silicon oxynitride/silicon oxide (ONO).

Figure 5:
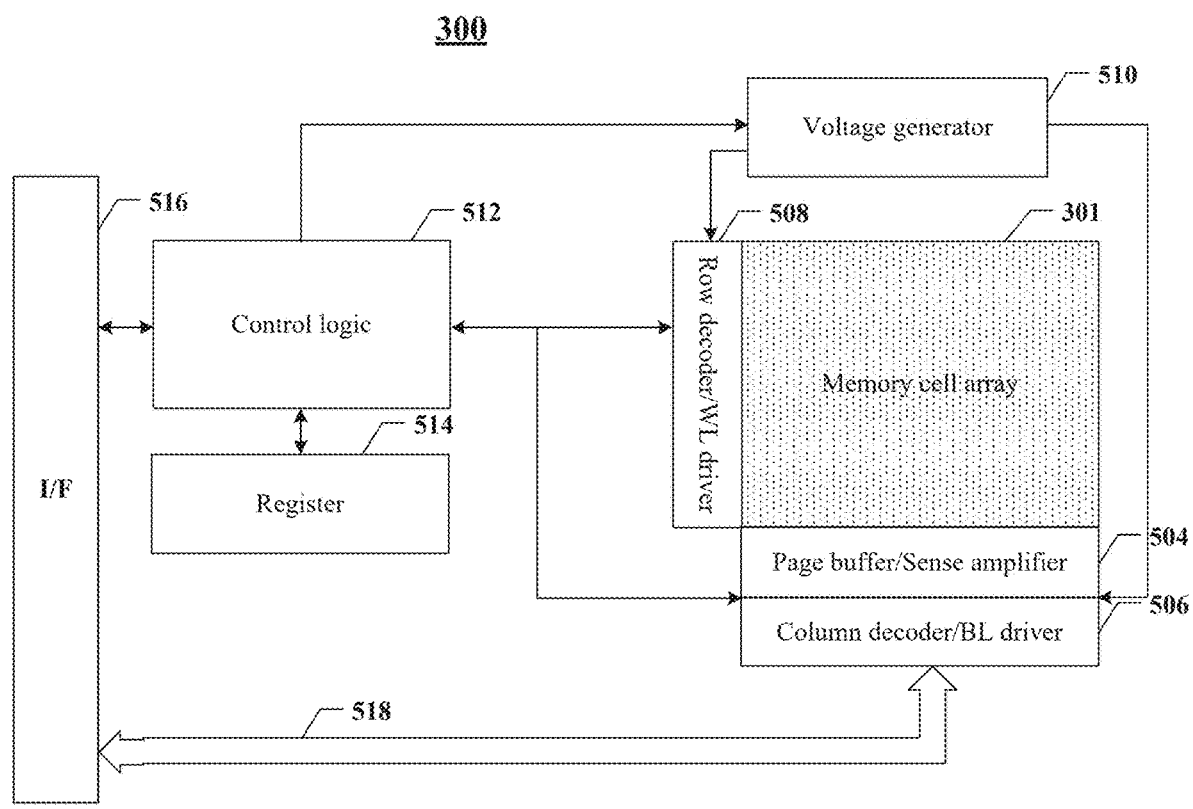
FIG. 5 is a schematic diagram of an example memory device including a memory cell array and peripheral circuits according to an example of the present disclosure.

Referring back to FIG. 3B, the peripheral circuit 302 can be coupled to the memory cell array 301 through bit lines 316, word lines 318, source lines 314, BSG lines 315, and TSG lines 313. The peripheral circuit 302 can include any suitable analog, digital, and mixed-signal circuits for facilitating the operations of the memory cell array 301 by applying and sensing at least one of voltage signals or current signals to and from each target memory cell 306 through bit lines 316, word lines 318, source lines 314, BSG lines 315, and TSG lines 313. The peripheral circuit 302 can include various types of peripheral circuits formed using metal-oxide-semiconductor (MOS) technologies. For example, FIG. 5 illustrates some example peripheral circuits, the peripheral circuit 302 including a page buffer/sense amplifier 504, a column decoder/bit line driver 506, a row decoder/word line driver 508, a voltage generator 510, control logic 512, registers 514, an interface 516, and a data bus 518. It is understood that in some examples, additional peripheral circuits not shown in FIG. 5 may be included as well.

Page buffer/sense amplifier 504 can be configured to read and program (write) data from and to the memory cell array 301 according to the control signals from control logic 512. In one example, page buffer/sense amplifier 504 may store program data (write data) to be programmed into the memory cell array 301. In another example, the page buffer/sense amplifier 504 may perform program verify operations to ensure that the data has been properly programmed into memory cells 306 coupled to selected word lines 318. In still another example, the page buffer/sense amplifier 504 may also sense the low power signals from the bit line 316 that represent data bits stored in the memory cells 306 and amplify the small voltage swing to recognizable logic levels in a read operation. Column decoder/bit line driver 506 can be configured to be controlled by control logic 512 and select one or more strings 308 by applying bit line voltages generated from the voltage generator 510.

The row decoder/word line driver 508 can be configured to be controlled by the control logic 512 and select/deselect blocks 304 of the memory cell array 301 and select/deselect word lines 318 of blocks 304. The row decoder/word line driver 508 can be further configured to drive word lines 318 using word line voltages generated from the voltage generator 510. In some examples, the row decoder/word line driver 508 can also select/deselect and drive BSG lines 315 and TSG lines 313 as well. As described below in detail, the row decoder/word line driver 508 is configured to perform program operations on the memory cells 306 coupled to the selected word line(s) 318. The voltage generator 510 can be configured to be controlled by the control logic 512 and generate the word line voltages (e.g., read voltage, program voltage, pass voltage, channel boost voltage, verification voltage, etc.), bit line voltages, and source line voltages to be supplied to the memory cell array 301.

The control logic 512 may be coupled to each other part of the peripheral circuit described above and configured to control the operation of each other part of the peripheral circuit. Registers 514 can be coupled to the control logic 512 and include status registers, command registers, and address registers for storing status information, command operation codes (OP codes), and command addresses for controlling the operations of each peripheral circuit. The interface 516 may be coupled to the control logic 512 and act as a control buffer to buffer and relay control commands received from a host system (not shown) to control logic 512, and to buffer and relay status information received from the control logic 512 to the host system. The interface 516 may further be coupled to the column decoder/bit line driver 506 via the data bus 518 and act as a data I/O interface and data buffer to buffer and relay data to or from the memory cell array 301.

In a practical application, as the number of the memory cells continues to increase to meet ever-increasing requirements for more storage capacity, the chance of cell failure also increases during the manufacturing of memory devices. For a NAND type memory, in a process of performing a Power On Reset (POR) operation, the peripheral circuit (e.g., a column selector such as a Bad Column Selector) may check the memory cell array for one time to see whether there is a failed cell, and if there is a failed cell, data of the failed cell is redistributed, mapped, and stored. However, hundreds of milliamps of power consumption that lasts for microseconds occurs in a process of tagging the failed cell (Bad Column Tag).

Figure 6:
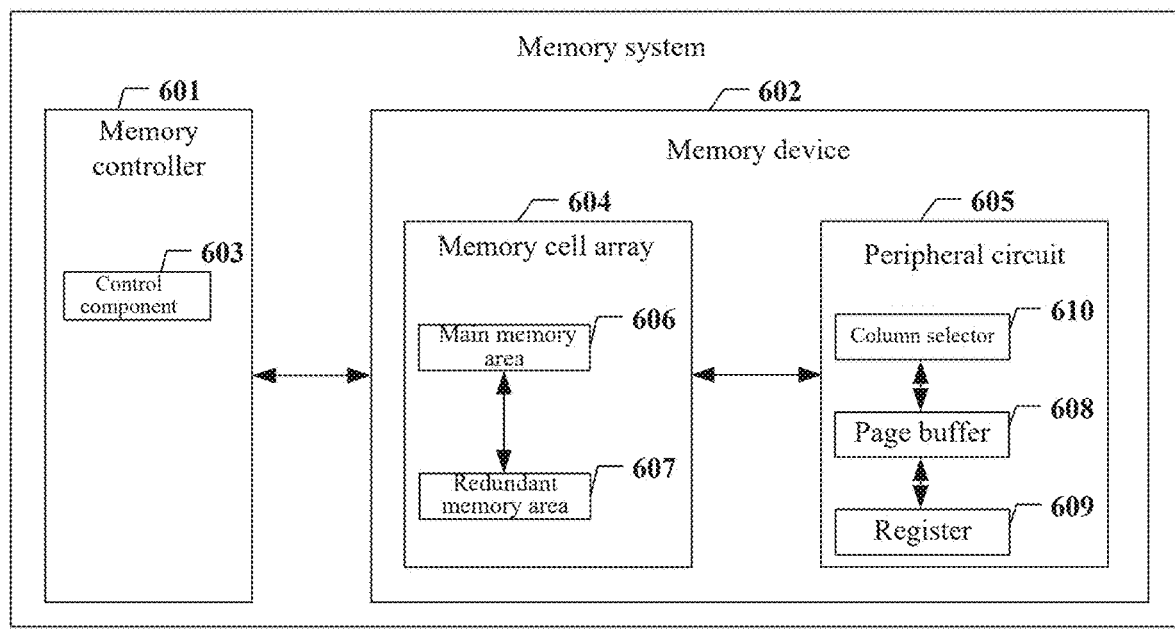
FIG. 6 is a schematic diagram of another memory device according to an example of the present disclosure.

Based on this, referring to FIG. 6, examples of the present disclosure further provide a memory device 602, comprising a memory cell array 604 and a peripheral circuit 605 coupled with the memory cell array, wherein the memory cell array 604 comprises a plurality of main memory areas 606 (main banks, also known as main columns or main groups) and at least one redundant memory area 607 (redundant bank, also known as a redundant column or a redundant group). The main memory area 606 and the redundant memory area 607 both comprise a plurality of memory cells. The redundant memory area 607, as a spare area of the main memory area 606, is configured to store data of the main memory area 606 which in the fault state. For each memory device, if a failed main memory area 606 is identified during testing after manufacturing, a repair solution may be employed, such that the redundant memory area 607 may replace the failed main memory area 606 for reading and writing data when the memory device is operated. Therefore, the use efficiency of the memory device may be improved.

In some examples, the number of the main memory areas in the memory cell array is N, and the number of the redundant memory areas is M, wherein N and M both are positive integers greater than or equal to 1, and N≥M. In other words, the main memory areas and the redundant memory areas may have a one-to-one correspondence (N=M), and may also have a one-to-many correspondence (N>M, or N<M). In some examples, in order to reduce potential waste of a chip area occupied by the redundant memory area, in some examples, the plurality of main memory areas correspond to one redundant memory area (N>M).

It should be understood that, in some examples, the memory cell array of the memory device may only comprise the main memory areas but not comprise the redundant memory areas. In order to understand an inventive intention of the present disclosure more clearly, in examples of the present disclosure, taking the memory cell array that comprises the main memory areas and the redundant memory areas, and the main memory areas and the redundant memory areas have a one-to-one correspondence as an example for illustration.

Referring to FIG. 6, the peripheral circuit 605 may comprise a page buffer 608 and a register 609, and the page buffer 608 may be an example of the page buffer 504 in the aforementioned examples. The register 609 may be an example of the register 514 in the aforementioned examples. The page buffer 608 is configured to store state information indicating states of the plurality of main memory areas and at least one redundant memory area, and each memory area corresponds to one piece of the state information. Herein, the state information may comprise a normal state and a fault state, wherein the normal state indicates that access operations, such as operations of reading, writing, and erasing data, may be performed on the current memory area (at least one of the main memory area or the redundant memory area), and the fault state indicates that the access operations cannot be performed on the current memory area (at least one of the main memory area or the redundant memory area). The register 609 is configured to store addresses of the main memory areas 606 which are in the fault state, i.e., first addresses. It should be understood that, after the memory device is powered down, data stored in the register 609 does not disappear, but data stored in the page buffer 608 disappears.

In some examples, the number of the main memory areas that are in the fault state stored in the register is L, wherein L is a positive integer greater than or equal to 0; and the number N of the main memory areas in the memory cell array is greater than or equal to the number L of the main memory areas that are in the fault state stored in the register, i.e., N≥L. Herein, when the number of the main memory areas and the number of the redundant memory areas have a one-to-one correspondence, the number L of the main memory areas that are in the fault state stored in the register is the same as the number M of the redundant memory areas, i.e., L=M. When the main memory areas and the redundant memory areas have a one-to-many correspondence, the number L of the main memory areas that are in the fault state stored in the register may be greater than the number M of the redundant memory areas, i.e., L>M, and may also be less than the number M of the redundant memory areas, i.e., L<M.

It is to be noted that, when the number L of the main memory areas that are in the fault state stored in the register is the same as the number of the main memory areas in the memory cell array, it indicates that the access operations cannot be performed on all the main memory areas in the memory cell array, and in this case, other processing can be performed on the memory cell array, such as recycling and the like. When L=0, there is no first address stored in the register (or the first address is a null address), and it indicates that there is no main memory area that is in the fault state in the memory cell array.

The peripheral circuit is configured to: before performing a power on reset operation, set all the state information of the plurality of main memory areas in the page buffer to the normal state (Good); and set the state information of the at least one redundant memory area in the page buffer to the fault state (Bad). In the process of performing the power on reset operation, match a second address of each of the plurality of main memory areas with the first address in the register; whether to modify state information of the respective main memory area in the page buffer to the fault state is determined according to a match result; and whether to modify the state information of the respective redundant memory area in the page buffer to the normal state is determined according to the match result.

In an example, referring to FIG. 7, FIG. 7 is a state information table of a main memory area and a redundant memory area provided by examples of the present disclosure. The address of each of the plurality of main memory areas in the memory cell array is denoted as the second address, and the address of the main memory area that is in the fault state stored in the register are denoted as the first address. The second address comprises a plurality of second addresses, and the first address comprises one or more first addresses. Before the power on reset operation is performed, all the state information of the plurality of main memory areas in the page buffer are the normal state, and the state information of the redundant memory area is the fault state.

In the process of performing the power on reset operation, the plurality of second addresses are compared with one or more first addresses one by one, wherein, when the second address is different from the first address (i.e., a match signal is 0), it indicates that the main memory area corresponding to the current second address in the page buffer is in the normal state, and in this case, the state information of the main memory area corresponding to the current second address in the page buffer does not need to be modified, i.e., is still in the normal state. Similarly, the state information of the redundant memory area corresponding to the main memory area in the page buffer also does not need to be modified, i.e., is still in the fault state.

When the second address is the same as the first address (i.e., the match signal is 1), it indicates that the main memory area corresponding to the current second address in the page buffer is in the fault state, and in this case, the register sends a strobe signal to the page buffer, and the page buffer receives the strobe signal; modifies, based on the strobe signal, the state information of the main memory area corresponding to the current second address in the page buffer to the fault state; and modifies, based on the strobe signal, the state information of the redundant memory area corresponding to the main memory area in the page buffer to the normal state.

After performing the power on reset operation, for the main memory area in the normal state in the memory cell array, the state information in the page buffer is still the normal state, and the redundant memory area corresponding to the main memory area in the normal state is not used for replacing the main memory area, such that the redundant memory area is still in the fault state, and does not participate in the access operations. Similarly, after performing the power on reset operation, for the main memory area in the fault state in the memory cell array, the state information in the page buffer is modified to the fault state, and for the redundant memory area for replacing the main memory area in the fault state, the state information in the page buffer is modified to the normal state, and can be used for performing the access operations.

In some examples, referring to FIG. 6, the peripheral circuit 605 further comprises: a column selector 610 connected with the page buffer 608. The column selector 610 is configured to receive the strobe signal, and perform, based on the strobe signal, a read operation on the main memory area corresponding to the current second address.

It is to be noted that, every time the match signal is 1, a toggle current needs to be applied each time when the state information is modified in the page buffer (the normal state is modified to the fault state, or the fault state is modified to the normal state), and the toggle current is inputted via a connection channel (an Ysel line). In a practical application, in order to reduce an occupied area of the peripheral circuit, the column selector and the page buffer share the connection channel (the Ysel line), such that, each time when the toggle current is applied to the page buffer, the toggle current is also applied to the column selector.

The column selector performs, based on the toggle current, a read operation on the main memory area corresponding to the current second address. The read operation reads data of the main memory area corresponding to the current second address, but does not output the data. It should be understood that, the data of the main memory area corresponding to the current second address is data in the redundant memory area corresponding to the main memory area. However, since the number of times to modify the state information in the page buffer is less, the number of times to apply the toggle current to the column selector is also less, such that additional power consumption generated is negligible.

It is to be noted that, as described above, if there is no first address stored in the register, it indicates that all the main memory areas in the memory cell array are in the normal state. In this case, the second address is different from the first address, the state information of the main memory areas does not need to be modified in the process of performing the power on reset operation, such that the number of times to apply the toggle current to the page buffer and the column selector is reduced, and generation of additional power consumption is avoided, thereby improving the performance of the memory device.

In some special examples, before the power on reset operation is performed, all the state information of the plurality of main memory areas in the page buffer is set to the fault state, and all the state information of the redundant memory areas is set to the normal state (contrary to the aforementioned examples). In the process of performing the power on reset operation, match the second address of each of the plurality of main memory areas with the first address in the register; and it is determined, according to the match result, that the state information of the respective main memory area in the page buffer is modified to the normal state, and the state information of the redundant memory area is modified to the fault state (contrary to the aforementioned examples).

It should be understood that, since the number of the main memory areas in the fault state in the memory device is far less than the number of the main memory areas in the normal state, the number of times to modify the state information in the page buffer in the aforementioned examples is less, and the number of times to apply the toggle current to the column selector is less, such that additional power consumption generated is less. While in the above-mentioned special examples, the number of times to modify the state information in the page buffer is more, and the number of times to apply the toggle current to the column selector is more, such that additional power consumption generated is more, not facilitating the improvement of the performance of the memory device.

In an example, referring to FIG. 8, FIG. 8 shows the number of times to apply the toggle current to the column selector in the aforementioned example (Example I) and the special example (Example II). The memory cell array comprises 8 main memory areas (e.g., <7:0>), wherein 7 main memory areas (<7:1>) are in the normal state, and 1 main memory area (<0>) is in the fault state. From FIG. 8, it can be seen that, in Example I, in the process of performing the power on reset operation, the number of times that the match signal is 1 is 1, i.e., one piece of state information in the page buffer needs to be modified, in other words, the toggle current only needs to be applied to the column selector once, such that less power consumption is generated. In Example II, in the process of performing the power on reset operation, the number of times that the match signal is 1 is 7, i.e., seven pieces of state information in the page buffer need to be modified, in other words, the toggle current needs to be applied to the column selector for seven times, and the read operation is performed for seven times, such that more power consumption is generated.

In other words, compared with the situations of, before performing the power on reset operation, setting all the state information of the plurality of main memory areas in the page buffer to the fault state, and then modifying, according to the match result, the state information of the respective main memory area in the page buffer to the normal state in the especial examples of the present disclosure, in the aforementioned examples of the present disclosure, before the power on reset operation is performed, all the state information of the plurality of main memory areas in the page buffer is set to the normal state, and then the state information of the respective main memory area in the page buffer is modified to the fault state according to the match result, such that the number of times to modify the state information in the page buffer is much less. It should be understood that a toggle current needs to be applied to the page buffer every time the state information is modified, and current loss exists during each application of the toggle current, such that the number of times to apply the toggle current to the page buffer may be reduced by reducing the number of times to modify the state information, so as to reduce current loss, thereby improving the performance of the memory device.

Figure 10:
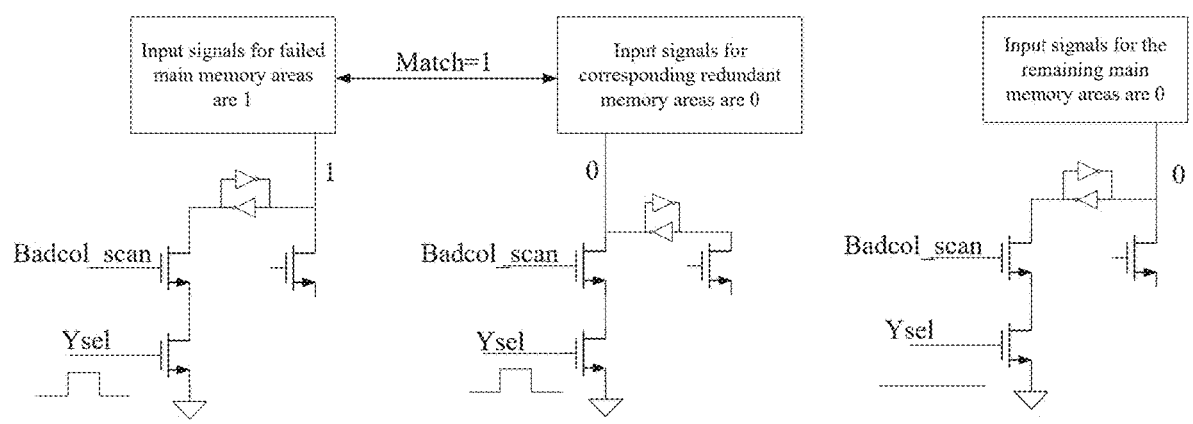
FIG. 10 is a schematic diagram of a circuit structure of a page buffer and a column selector in a process of performing a power on reset operation according to an example of the present disclosure.
Figure 11:
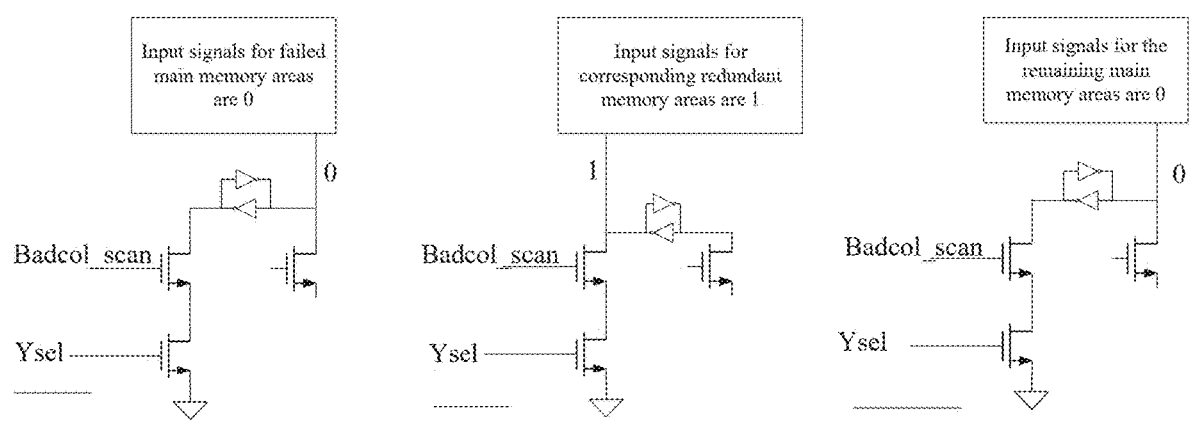
FIG. 11 is a schematic diagram of a circuit structure of a page buffer and a column selector after performing a power on reset operation according to an example of the present disclosure.

A relationship between the match signal in the peripheral circuit and the toggle current is described in detail below with reference to FIGS. 9, 10, and 11. FIG. 9 is a schematic diagram of a circuit structure of the page buffer and the column selector before the power on reset operation is performed. FIG. 10 is a schematic diagram of a circuit structure of the page buffer and the column selector in a process of performing a power on reset operation. FIG. 11 is a schematic diagram of a circuit structure of the page buffer and the column selector after the power on reset operation is performed.

Referring to FIG. 9, before the power on reset operation is performed, all the state information of the plurality of main memory areas is set to the normal state, in this case, input signals in circuits corresponding to the state information of the plurality of main memory areas in the page buffer are 0, and there is no pulse signal on the Ysel line. In the figure, A represents two phase inverters, the two phase inverters are configured to enhance data retention, and Badcol scan is a normally open signal. Furthermore, the state information of the redundant memory areas in the page buffer is set to the fault state, in this case, the input signals in circuits corresponding to the state information of the redundant memory areas in the page buffer are 1, and there is no pulse signal on the Ysel line.

Referring to FIG. 10, when the match signal is 1, input signals in the circuits corresponding to the main memory areas in the fault state in the page buffer and the redundant memory areas corresponding to the main memory areas are changed, wherein the register sends a strobe signal to the page buffer, the input signals in the circuits corresponding to the state information of the main memory areas are modified to 1, the input signals in the circuits corresponding to the state information of the redundant memory areas are modified to 0, and the toggle current is inputted via the Ysel line, i.e., there is a pulse signal on the Ysel line. In this case, the column selector is connected with the Ysel line, and after receiving the toggle current, the column selector performs the read operation on the current main memory area in the fault state to read data in the redundant memory area corresponding to the current main memory area.

The input signals of the remaining main memory areas (i.e., the main memory areas in the normal state) in the page buffer and the redundant memory areas corresponding to the main memory areas are not changed and are still 0, and there is no pulse signal on the Ysel line.

In addition, in the process of performing the power on reset operation, when the match signal is 0, there is no pulse signal on the Ysel line.

Referring to FIG. 11, after the power on reset operation is performed, the input signals in the circuits corresponding to the state information of the plurality of main memory areas (comprising failed main memory areas and remaining main memory areas) in the page buffer are all 0, the input signals in the circuits corresponding to the state information of the redundant memory areas are all 1, and there is no pulse signal on the Ysel line.

In some examples, the memory system comprises a universal flash storage (UFS) device or a solid-state drive (SSD). The memory device comprises a NAND type memory.

Figure 12:
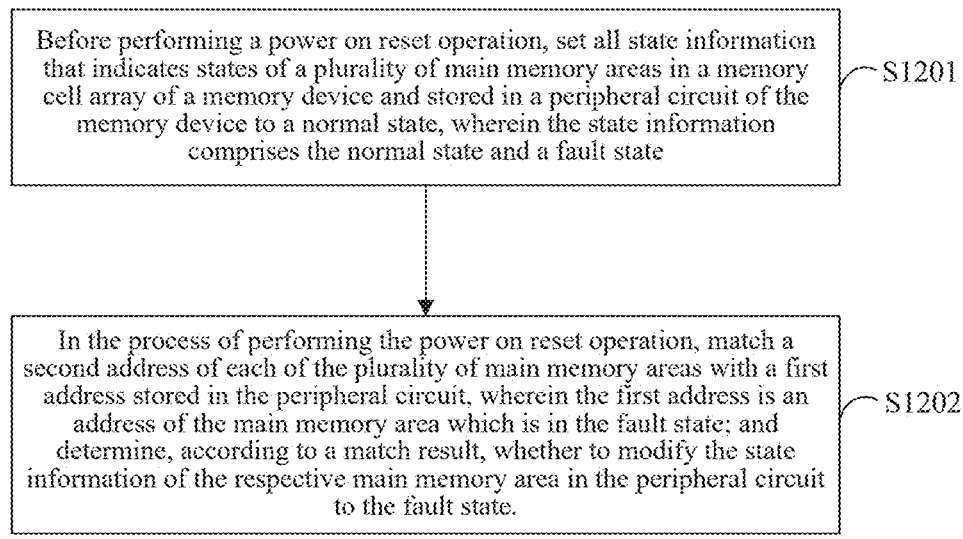
FIG. 12 is an example flow diagram of an operation method of a memory device according to an example of the present disclosure.

Based on the above-mentioned memory device, examples of the present disclosure further provide an operation method of a memory device. As shown in FIG. 12, FIG. 12 is an example flow diagram of an operation method of a memory device provided by examples of the present disclosure. The operation method comprises the following operations:

S1201: Before performing a power on reset operation, set all state information that indicates states of a plurality of main memory areas in a memory cell array of a memory device and stored in a peripheral circuit of the memory device to a normal state, wherein the state information comprises the normal state and a fault state.

S1202: In the process of performing the power on reset operation, match a second address of each of the plurality of main memory areas with a first address stored in the peripheral circuit, wherein the first address is an address of the main memory area which is in the fault state; and determine, according to a match result, whether to modify the state information of the respective main memory area in the peripheral circuit to the fault state.

It should be understood that the operations as shown in FIG. 12 are not exclusive, and other operations may also be performed before, after, or between any of the shown operations.

In some examples, the method further comprises: when the match result indicates that the second address is the same as the first address, modifying the state information of the main memory area corresponding to the second address to the fault state.

In some examples, the when the match result indicates that the second address is the same as the first address, modifying the state information of the main memory area corresponding to the second address to the fault state comprises: when the second address of the main memory area in the memory cell array is the same as the first address of the main memory area in the peripheral circuit, modifying the state information of the main memory area corresponding to the current second address in the peripheral circuit to the fault state.

In some examples, the operation method further comprises: in the process of modifying the state information of the main memory area corresponding to the current second address in the peripheral circuit to the fault state, performing a read operation on the main memory area corresponding to the current second address.

In some examples, the memory cell array further comprises at least one redundant memory area, wherein the redundant memory area is configured to store data of the main memory area which is in the fault state, and wherein the peripheral circuit is further configured to: store state information indicating a state of the redundant memory area, and wherein the operation method further comprises: before performing the power on reset operation, setting the state information of the at least one redundant memory area in the peripheral circuit to the fault state; and in the process of performing the power on reset operation, determining, according to the match result, whether to modify the state information of the respective redundant memory area in the peripheral circuit to the normal state.

In some examples, the operation method further comprises: when the match result indicates that the second address is the same as the first address, modifying the state information of the redundant memory area corresponding to the second address to the normal state.

In some examples, the number of the main memory areas in the memory cell array is N, and the number of the redundant memory areas is M, wherein N and M both are positive integers greater than or equal to 1, and N≥M, and the number of the main memory areas that are in the fault state stored in the peripheral circuit is L, wherein L is a positive integer greater than or equal to 0, and L≤N.

Examples of the present disclosure further provide a memory system. Referring back to FIG. 6, the memory system comprises one or more memory devices 602 as described in the above-mentioned examples; and a memory controller 601, wherein the memory controller 601 is coupled with the memory device 602 and configured to control the memory device 602. In some examples, the memory controller 601 comprises a control component 603, and the control component 603 is, for example, a central processing unit (CPU), a microprocessor unit (MCU), etc., and is configured to control the memory system as a whole.

An example of the present disclosure also provides a storage medium storing thereon executable instructions that, when executed by a memory device, can implement operations of the method described in the above examples of the present disclosure.

In some examples, the storage medium may be memories such as Ferromagnetic Random Access Memory (FRAM), Read Only Memory (ROM), or Programmable Read-Only Memory (PROM), Erasable Programmable Read-Only Memory (EPROM), Electrically Erasable Programmable Read-Only Memory (EEPROM), Flash Memory, magnetic surface memory, optical disc, or Compact Disc Read-Only Memory (CD-ROM); alternatively, it may be various devices including one of the above memory devices or any combination thereof.

In some examples, executable instructions may in the form of a program, software, software module, script, or code, written in any form of programming language, including compiled or interpreted languages, or declarative or procedural languages, and may be deployed in any form, including deployed as a stand-alone program or deployed as a module, component, subroutine, or other means suitable for use in a computing environment.

As an example, executable instructions may, but do not necessarily correspond to, files in a file system and may be stored as part of a file holding other programs or data, for example, stored in one or more scripts in a Hyper Text Markup Language (HTML) document, stored in a single file that is specific to the program in question, or, stored in multiple collaborative files (for example, a file that stores one or more modules, subroutines, or portions of code).

As an example, the executable instruction may be deployed on an electronic apparatus for execution, or on a plurality of electronic apparatuses at one site for execution, or distributed on a plurality of electronic apparatuses interconnected through a communication network at a plurality of sites for execution.

Based on this, examples of the present disclosure provide a memory device and an operation method thereof, a memory system and a storage medium. The memory device provided by the examples of the present disclosure comprises: a memory cell array, and a peripheral circuit coupled with the memory cell array, wherein the memory cell array comprises a plurality of main memory areas, the peripheral circuit comprises a page buffer and a register, the page buffer is configured to store state information indicating states of the plurality of main memory areas, wherein the state information comprises a normal state and a fault state, the register is configured to store a first address of the main memory area which is in the fault state, and the peripheral circuit is configured to: before performing a power on reset operation, set all the state information of the plurality of main memory areas in the page buffer to the normal state; in the process of performing the power on reset operation, match a second address of each of the plurality of main memory areas with the first address in the register; and determine, according to a match result, whether to modify state information of the respective main memory area in the page buffer to the fault state.

In some examples, the peripheral circuit is further configured to: when the match result indicates that the second address is the same as the first address, modify the state information of the main memory area corresponding to the second address in the page buffer to the fault state.

In some examples, the peripheral circuit is configured to: when the second address of the main memory area in the memory cell array is the same as the first address of the main memory area in the register, send a strobe signal by the register to the page buffer; and based on the strobe signal, modify, by the page buffer, the state information of the main memory area corresponding to the current second address in the page buffer to the fault state.

In some examples, the peripheral circuit further comprises: a column selector connected with the page buffer, wherein the column selector is configured to: receive the strobe signal; and perform a read operation on the main memory area corresponding to the current second address based on the strobe signal.

In some examples, the memory cell array further comprises: at least one redundant memory area, wherein the redundant memory area is configured to store data of the main memory area which is in the fault state, and wherein the page buffer is further configured to: store state information indicating a state of the redundant memory area, and wherein the peripheral circuit is further configured to: before performing the power on reset operation, set the state information of the at least one redundant memory area in the page buffer to the fault state; and in the process of performing the power on reset operation, determine, according to the match result, whether to modify the state information of the respective redundant memory area in the page buffer to the normal state.

In some examples, the peripheral circuit is further configured to: when the match result indicates that the second address is the same as the first address, modify the state information of the redundant memory area corresponding to the second address to the normal state.

In some examples, the number of the main memory areas in the memory cell array is N, and the number of the redundant memory areas is M, wherein N and M both are positive integers greater than or equal to 1, and N≥M, and the number of the main memory areas that are in the fault state stored in the register is L, wherein L is a positive integer greater than or equal to 0, and L≤M. In some examples, the memory device comprises a NAND type memory.

The present disclosure further provides a memory system, comprising: one or more memory devices as described in the above-mentioned examples; and a memory controller coupled with the memory device and configured to control the memory device.

The present disclosure further provides an operation method of a memory device. The memory device comprises a memory cell array, and a peripheral circuit coupled with the memory cell array. The operation method comprises: before performing a power on reset operation, setting all state information that indicates states of a plurality of main memory areas in the memory cell array and stored in the peripheral circuit to a normal state, wherein the state information comprises the normal state and a fault state; in the process of performing the power on reset operation, matching a second address of each of the plurality of main memory areas with a first address stored in the peripheral circuit, wherein the first address is an address of the main memory area which is in the fault state; and determining, according to a match result, whether to modify the state information of the respective main memory area in the peripheral circuit to the fault state.

In some examples, the method further comprises: when the match result indicates that the second address is the same as the first address, modifying the state information of the main memory area corresponding to the second address to the fault state.

In some examples, the when the match result indicates that the second address is the same as the first address, modifying the state information of the main memory area corresponding to the second address to the fault state comprises: when the second address of the main memory area in the memory cell array is the same as the first address of the main memory area in the peripheral circuit, modifying the state information of the main memory area corresponding to the current second address in the peripheral circuit to the fault state.

In some examples, the operation method further comprises: in the process of modifying the state information of the main memory area corresponding to the current second address in the peripheral circuit to the fault state, performing a read operation on the main memory area corresponding to the current second address.

In some examples, the memory cell array further comprises: at least one redundant memory area, wherein the redundant memory area is configured to store data of the main memory area which is in the fault state, and wherein the peripheral circuit is further configured to: store state information indicating a state of the redundant memory area, and wherein the operation method further comprises: before performing the power on reset operation, setting the state information of the at least one redundant memory area in the peripheral circuit to the fault state; and in the process of performing the power on reset operation, determining, according to the match result, whether to modify the state information of the respective redundant memory area in the peripheral circuit to the normal state.

In some examples, the operation method further comprises: when the match result indicates that the second address is the same as the first address, modifying the state information of the redundant memory area corresponding to the second address to the normal state.

In some examples, the number of the main memory areas in the memory cell array is N, and the number of the redundant memory areas is M, wherein N and M both are positive integers greater than or equal to 1, and N≥M, and the number of the main memory areas that are in the fault state stored in the peripheral circuit is L, wherein L is a positive integer greater than or equal to 0, and L≤N.

Examples of the present disclosure further provide a storage medium, having executable instructions stored thereon that, when executed by a memory device, can implement operations of the method in the above-mentioned examples of the present disclosure.

In the examples of the present disclosure, before the power on reset operation is performed, all the state information of the plurality of main memory areas in the page buffer is set to the normal state; during the process of performing the power on reset operation, match the second address of each of the plurality of main memory areas with the first address of the main memory area that is in the fault state and stored in the register; and whether to modify state information of the respective main memory area in the page buffer to the fault state is determined according to the match result. Since the number of the main memory areas that are in the fault state in the memory device is far less than the number of the main memory areas that are in the normal state, the number of times to modify the state information is much less compared with the situations of, before performing the power on reset operation, setting all the state information of the plurality of main memory areas in the page buffer to the fault state, and modifying, according to the match result, the state information of the respective main memory areas in the page buffer to the normal state. It should be understood that, a toggle current needs to be applied to the page buffer every time the state information is modified, and current loss exists during each application of the toggle current, such that the number of times to apply the toggle current to the page buffer may be reduced by reducing the number of times to modify the state information, so as to reduce the current loss, thereby improving the performance of the memory device.

It should be understood that, references to "one example" or "an example" throughout this specification mean that particular features, structures, or characteristics related to the example are comprised in at least one example of the present disclosure. Therefore, "in one example" or "in an example" presented throughout this specification does not necessarily refer to the same example. Furthermore, these particular features, structures, or characteristics may be incorporated in one or more examples in any suitable manner. It is to be understood that, in various examples of the present disclosure, sequence numbers of the above processes do not indicate an execution order, and an execution order of various processes shall be determined by functionalities and intrinsic logics thereof, and shall constitute no limitation on an implementation process of the examples of the present disclosure. The above sequence numbers of the examples of the present disclosure are only for description, and do not represent advantages or disadvantages of the examples.

The methods disclosed in several method examples as provided by the present disclosure may be combined freely to obtain new method examples in case of no conflicts. The above descriptions are merely examples of the present disclosure, and the protection scope of the present disclosure is not limited to these. Any variation or replacement that may be readily figured out by those skilled in the art within the technical scope disclosed by the present disclosure shall fall within the protection scope of the present disclosure. Therefore, the protection scope of the present disclosure shall be defined by the protection scope of the claims.

What is claimed is:
1. A memory device, comprising:
  a memory cell array including a plurality of main memory areas; and
  a peripheral circuit coupled with the memory cell array, wherein the peripheral circuit includes:
    a page buffer configured to store a state information indicating states of the plurality of main memory areas, wherein the state information includes a normal state and a fault state; and
    a register configured to store a first address of a main memory area of the plurality of main memory areas which is in the fault state, and wherein the peripheral circuit is configured to:
    before performing a power on reset operation, set all the state information of the plurality of main memory areas in the page buffer to the normal state;
    during the performing the power on reset operation, match a second address of each of the plurality of main memory areas with the first address in the register; and
    determine, according to a match result, whether to modify the state information of a respective main memory area in the page buffer to the fault state.

2. The memory device of claim 1, wherein the peripheral circuit is further configured to, when the match result indicates that the second address is the same as the first address, modify the state information of the respective main memory area corresponding to the second address in the page buffer to the fault state.

3. The memory device of claim 2, wherein the peripheral circuit is configured to:

when the second address of the respective main memory area is the same as the first address of the main memory area in the register, send a strobe signal by the register to the page buffer; and based on the strobe signal, modify, by the page buffer, the state information of the respective main memory area corresponding to a current second address in the page buffer to the fault state.

4. The memory device of claim 3, wherein the peripheral circuit further includes a column selector connected with the page buffer, wherein the column selector is configured to:

receive the strobe signal; and perform a read operation on the respective main memory area corresponding to the current second address based on the strobe signal.

5. The memory device of claim 2, wherein the memory cell array further includes at least one redundant memory area, wherein the at least one redundant memory area is configured to store data of the main memory area which is in the fault state, and wherein the page buffer is further configured to store state information indicating a state of the at least one redundant memory area, and wherein the peripheral circuit is further configured to:

before performing the power on reset operation, set the state information of the at least one redundant memory area in the page buffer to the fault state; and during the performing the power on reset operation, determine, according to the match result, whether to modify the state information of the respective redundant memory area in the page buffer to the normal state.

6. The memory device of claim 5, wherein the peripheral circuit is further configured to when the match result indicates that the second address is the same as the first address, modify the state information of the respective redundant memory area corresponding to the second address to the normal state.

7. The memory device of claim 5, wherein a number of the main memory areas in the memory cell array is N, and a number of redundant memory areas is M, wherein N and M both are positive integers greater than or equal to 1, and N≥M, and a number of the main memory areas that are in the fault state stored in the register is L, wherein L is a positive integer greater than or equal to 0, and N≥L.

8. The memory device of claim 1, including a NAND type memory.

9. A memory system, comprising:

one or more memory devices, each of the one or more memory devices including:

a memory cell array including a plurality of main memory areas; and a peripheral circuit coupled with the memory cell array, wherein the peripheral circuit includes:

a page buffer configured to store state information indicating states of the plurality of main memory areas, wherein the state information includes a normal state and a fault state; and a register configured to store a first address of a main memory area of the plurality of main memory areas which is in the fault state, and wherein the peripheral circuit is configured to:

before performing a power on reset operation, set all the state information of the plurality of main memory areas in the page buffer to the normal state;

during the performing the power on reset operation, match a second address of each of the plurality of main memory areas with the first address in the register; and determine, according to a match result, whether to modify the state information of a respective main memory area in the page buffer to the fault state; and a memory controller coupled with the one or more memory devices and configured to control the one or more memory devices.

10. The memory system of claim 9, wherein the peripheral circuit is further configured to, when the match result indicates that the second address is the same as the first address, modify the state information of the respective main memory area corresponding to the second address in the page buffer to the fault state.

11. The memory system of claim 10, wherein the peripheral circuit is configured to:

when the second address of the respective main memory area is the same as the first address of the main memory area in the register, send a strobe signal by the register to the page buffer; and based on the strobe signal, modify, by the page buffer, the state information of the respective main memory area corresponding to a current second address in the page buffer to the fault state.

12. The memory system of claim 11, wherein the peripheral circuit further includes a column selector connected with the page buffer, wherein the column selector is configured to:

receive the strobe signal; and perform a read operation on the respective main memory area corresponding to the current second address based on the strobe signal.

13. The memory system of claim 10, wherein the memory cell array further includes at least one redundant memory area, wherein the at least one redundant memory area is configured to store data of the main memory area which is in the fault state, and wherein the page buffer is further configured to store state information indicating a state of the at least one redundant memory area, and wherein the peripheral circuit is further configured to:

before performing the power on reset operation, set the state information of the at least one redundant memory area in the page buffer to the fault state; and during the performing the power on reset operation, determine, according to the match result, whether to modify the state information of the respective redundant memory area in the page buffer to the normal state.

14. An operation method of a memory device, wherein the memory device comprises:

a memory cell array; and a peripheral circuit coupled with the memory cell array, and wherein the operation method includes:

before performing a power on reset operation, setting all state information that indicates states of a plurality of main memory areas in the memory cell array and stored in the peripheral circuit to a normal state, wherein the state information includes the normal state and a fault state;

during the performing the power on reset operation, matching a second address of each of the plurality of main memory areas with a first address stored in the peripheral circuit, wherein the first address is an address of a main memory area of the plurality of main memory areas which is in the fault state; and determining, according to a match result, whether to modify the state information of a respective main memory area in the peripheral circuit to the fault state.

15. The operation method of claim 14, further including, when the match result indicates that the second address is the same as the first address, modifying the state information of the respective main memory area corresponding to the second address to the fault state.

16. The operation method of claim 15, wherein when the match result indicates that the second address is the same as the first address, the modifying the state information of the respective main memory area corresponding to the second address to the fault state further includes when the second address of the main memory area in the memory cell array is the same as the first address of the main memory area in the peripheral circuit, modifying the state information of the respective main memory area corresponding to a current second address in the peripheral circuit to the fault state.

17. The operation method of claim 16, further including during the modifying the state information of the respective main memory area corresponding to the current second address in the peripheral circuit to the fault state, performing a read operation on the respective main memory area corresponding to the current second address.

18. The operation method of claim 15, wherein the memory cell array further includes at least one redundant memory area, wherein the redundant memory area is configured to store data of the main memory area which is in the fault state, and wherein the peripheral circuit is further configured to store state information indicating a state of the redundant memory area, and wherein the operation method further includes:

before performing the power on reset operation, setting the state information of the at least one redundant memory area in the peripheral circuit to the fault state; and during the performing the power on reset operation, determining, according to the match result, whether to modify the state information of a respective redundant memory area in the peripheral circuit to the normal state.

19. The operation method of claim 18, further including, when the match result indicates that the second address is the same as the first address, modifying the state information of the respective redundant memory area corresponding to the second address to the normal state.

20. The operation method of claim 19, wherein a number of the main memory areas in the memory cell array is N, and a number of redundant memory areas is M, wherein N and M both are positive integers greater than or equal to 1, and N≥M, and a number of the main memory areas that are in the fault state stored in the peripheral circuit is L, wherein L is a positive integer greater than or equal to 0, and L≤N.

\* \* \* \* \*